P. J. H. BERNARD.
ELECTRIC HEATER.
APPLICATION FILED DEC. 9, 1920.

1,428,071.

Patented Sept. 5, 1922.
3 SHEETS—SHEET 1.

Inventor
Pierre J. H. Bernard
By William Clinton
Attorney

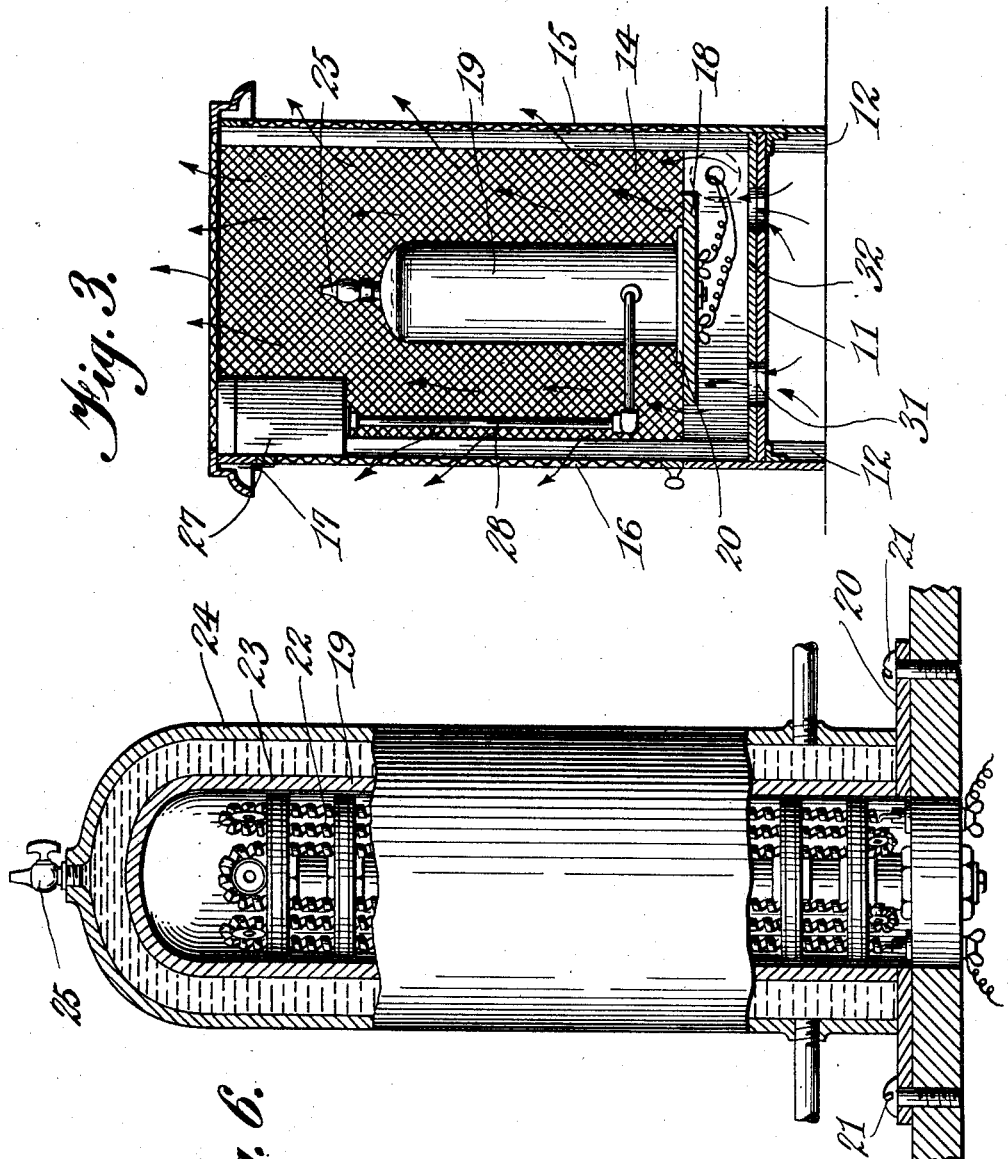

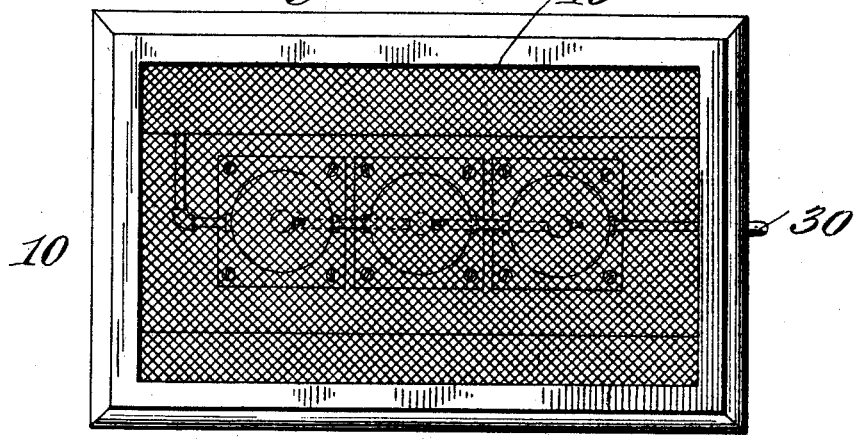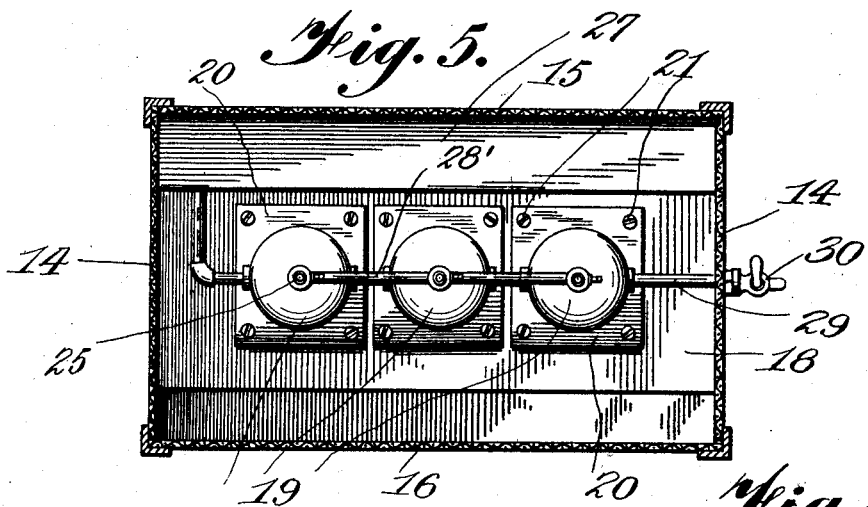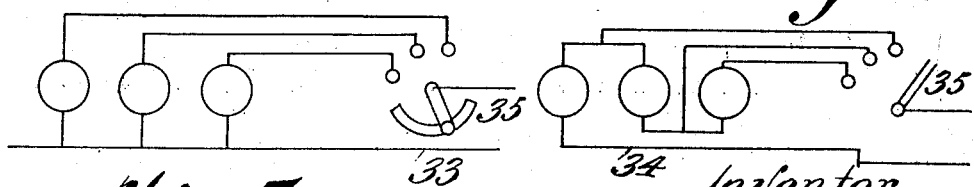

Patented Sept. 5, 1922.

1,428,071

UNITED STATES PATENT OFFICE.

PIERRE JOSEPH HENRI BERNARD, OF MONTREAL, QUEBEC, CANADA.

ELECTRIC HEATER.

Application filed December 9, 1920. Serial No. 429,453.

*To all whom it may concern:*

Be it known that I, PIERRE JOSEPH HENRI BERNARD, a subject of the King of Great Britain, residing at Montreal, Province of Quebec, Canada, have invented certain new and useful Improvements in Electric Heaters; and I do hereby declare that the following is a full, clear, and exact description of the invention, such as will enable others skilled in the art to which it appertains to make and use the same.

The present invention relates to new and useful improvements in electric heaters.

The primary object of the invention is the provision of an electric heater for rooms of buildings and other purposes so arranged and designed as to take the place of the usual radiators or registers attached to the customary heating plants.

Another object of the invention is the provision of an electric heater for the rooms of buildings and the like which is so constructed as to avoid the unhealthy dry heat produced by heaters of similar nature and so designed that it will produce a moist heat for the rooms of buildings and the like.

Another object of the invention is the provision of a heater so arranged that one or more heating elements may be employed and which may be actuated either singly or in plurality for the purpose of heating a room to the required degree.

Still another object of the invention is the provision of a heater such as above referred to which is so constructed that ready access may be had thereto and to the several parts thereof for the purposes of repairing or replacing parts when necessary.

A further object of the invention is the provision of an electric heater such as above described, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawings forming a part of the present application, and in which:

Figure 3 is a transverse sectional view thereof;

Figure 4 is a top plan view;

Figure 5 is a horizontal sectional view;

Figure 6 is a transverse sectional view taken through one of the heating elements showing the surrounding water casing;

Figure 7 is a diametric view showing one form of wiring wherein the heating elements are connected in parallel; and, Figure 8 is a similar view showing said elements connected in series.

Figure 1:
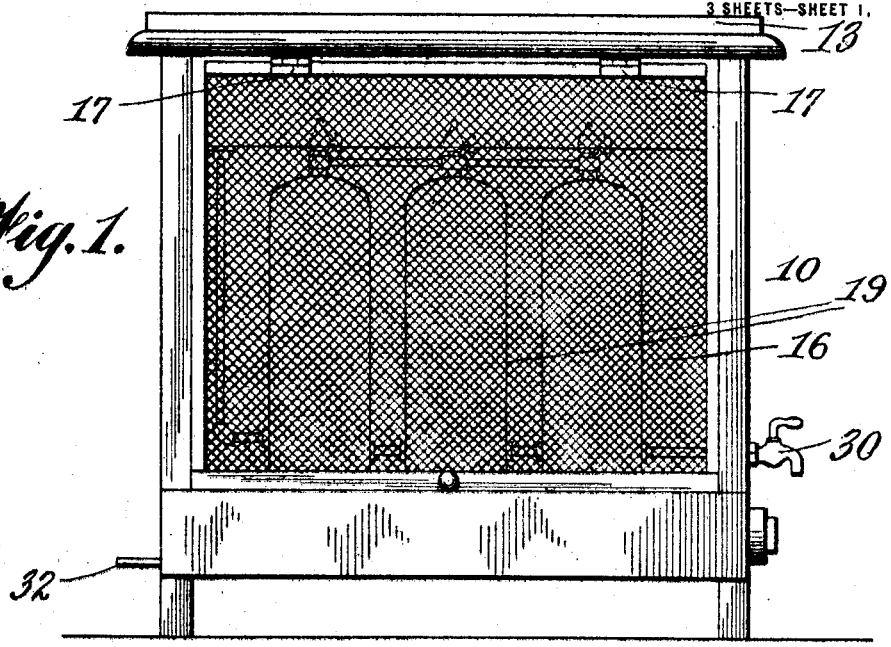
Figure 1 is a front elevation of a heater constructed in accordance with the invention.
Figure 2:
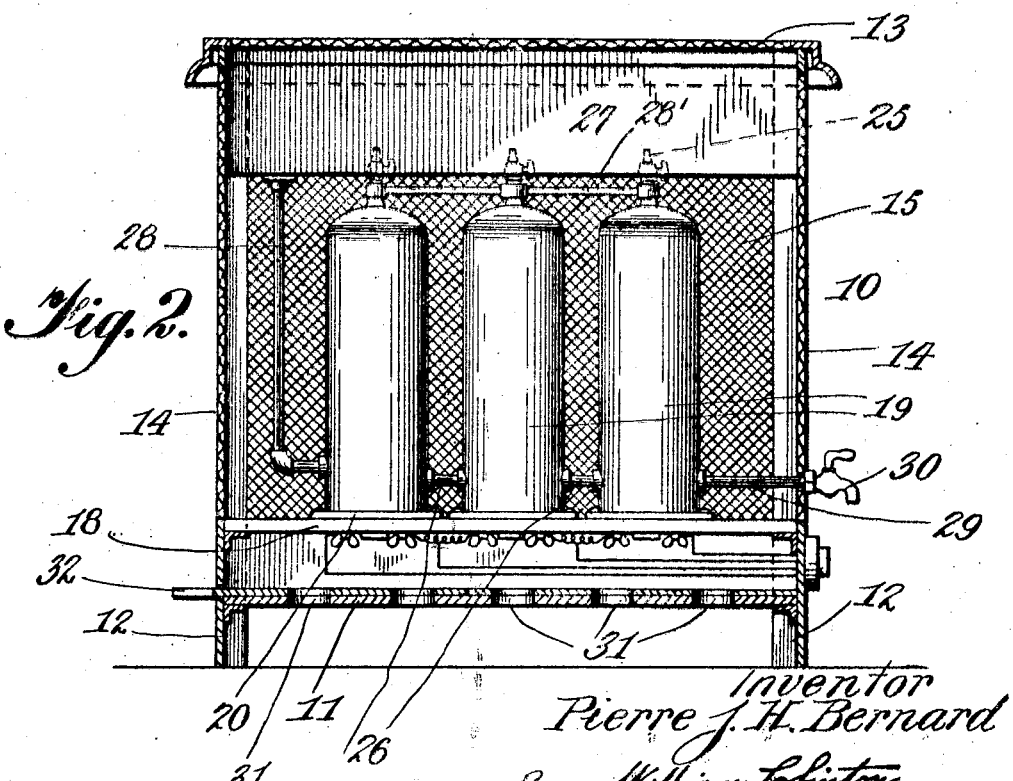
Figure 2 is a longitudinal sectional view thereof.

Referring now to the accompanying drawings by corresponding characters of reference throughout the several views, the numeral 10 designates in general my improved heater which comprises a base 11 mounted upon the legs 12, a top 13, end walls 14, a rear wall 15 and a front wall 16, the latter of which is hinged at its upper edge at 17 to the top 13 so it can be opened and access had to the interior thereof.

A suitable support 18 extends longitudinally of the heater above the base 11 and upon this support 18 are mounted the several heating elements 19 which are carried by plates 20 which may be secured to the said support 18 by bolts or other suitable means shown at 21.

The heating element is shown at 22 and may be of any desired form being mounted in a casing 23 which is surrounded by a water jacket 24.

The upper end of the water jacket 24 is provided with a suitable drain cock 25 from which the air may be exhausted when the said water jacket is being filled with water.

The casing 23 and water jacket 24 may be soldered or secured in any preferred manner to the plates 20 above referred to.

The foregoing description included but one of the heating elements, but any desired number may be included and for the purposes of illustration a heater 10 is shown provided with three such elements. The water jackets of these elements are provided with connecting nipples 26 which afford communication between the several elements above referred to.

A tank 27 is mounted in the upper portion of the heater below the top 13 and is connected by a pipe 28 to the water jacket 24 of one of said heaters, while another of said water jackets 24 may be provided with an outlet pipe 29 terminally equipped with a faucet 30 by means of which the water may be drawn from the device if desired.

The bottom 11 is provided with a plurality of openings 31 through which a draft is produced and which passes upwardly around the heating elements and out through the sides, ends and top of the heater which may be formed of reticulate material if desired. The tank 27 containing water and the heating elements being surrounded by water produces a moist air which will be more healthful than the usual dry air produced by such devices.

A suitable damper 32 may be provided for controlling the draft through the bottom 11, while the elements 22 may be connected either in parallel by the conductors 33 as shown in Figure 7 or in series by the conductors 34 shown in Figure 8.

In each of such arrangements, a suitable switch 35 may be employed for making or breaking the circuit including the elements 22 as desired.

From the foregoing description, taken in connection with the accompanying drawings, it will be manifest that an electric heater is provided which will fulfil all of the necessary requirements of such a device, and it should be understood in this connection, that various minor changes in the specific details of construction can be resorted to within the scope of the appended claims, without departing from the spirit or sacrificing any of the advantages of the invention.

As shown in the drawings, the upper ends of the water jackets 24 may be connected by a pipe line 28' in order to provide for a complete circulation of water through all of said jackets.

Having thus fully described the invention, what I claim as new and desire to protect by Letters Patent is:—

1. A heater such as described, including a base, opposite side and end walls and a top closure, a plurality of heating elements mounted therein, water jackets surrounding said heating elements and having communication, a tank mounted within said walls, and a communication between the tank and water jackets.

2. In a heater such as described, a base, said base having perforations therein, insulated side and end walls and a cover for said heater, heating elements mounted within said walls, water jackets surrounding said heating elements, means for connecting said water jackets, a tank, means for supplying water to said water jackets from the tank, and means for discharging water from said water jackets.

3. A heater such as described, including a base, said base having openings therein, means for controlling said openings, a support mounted upon said base, heating elements mounted upon said support, water jackets surrounding said heating elements, a communication between said water jackets, means for supplying water to the water jackets, means for drawing the water from said water jackets, reticulated side and end walls extending from said base, a cover for said walls, and means for controlling the draft through the openings in the base and through said reticulated walls.

4. In a heater such as described, a plurality of reticulated side and end walls, a base upon which said walls are mounted, a cover secured to said walls, a support mounted upon the base, a plurality of electric heating elements mounted upon the support, casings for said elements, water jackets surrounding said casings, nipples connecting said water jackets, a tank, a pipe connecting the tank and one of said water jackets, an outlet pipe leading from one of said water jackets, vent openings for said water jackets, said base having openings therein, means for controlling said openings, and means for operatively wiring the heating elements, and a switch for controlling said elements.

In witness whereof I have hereunto set my hand.

PIERRE JOSEPH HENRI BERNARD.